No. 813,988. PATENTED FEB. 27, 1906.
J. J. McMANMON.
PLOW.
APPLICATION FILED MAY 10, 1905.

Witnesses
M. Bailey
M. A. Schmidt

Inventor
John J. McManmon,
by Milo B. Stevens & Co. Attorneys

UNITED STATES PATENT OFFICE.

JOHN JOSEPH McMANMON, OF ATLANTA, GEORGIA, ASSIGNOR OF ONE-HALF TO O. W. LINTNER, OF IRONTON, OHIO.

PLOW.

No. 813,988.

Specification of Letters Patent.

Patented Feb. 27, 1906.

Application filed May 10, 1905. Serial No. 259,721.

*To all whom it may concern:*

Be it known that I, JOHN JOSEPH MCMANMON, a citizen of the United States, residing at Atlanta, in the county of Fulton and State of Georgia, have invented new and useful Improvements in Plows, of which the following is a specification.

My invention relates to plows, and has for its object to provide a simple and efficient clamp for fastening the shovel to the standard; and to this end the invention consists in certain novel features of construction hereinafter described and claimed.

Figure 1:
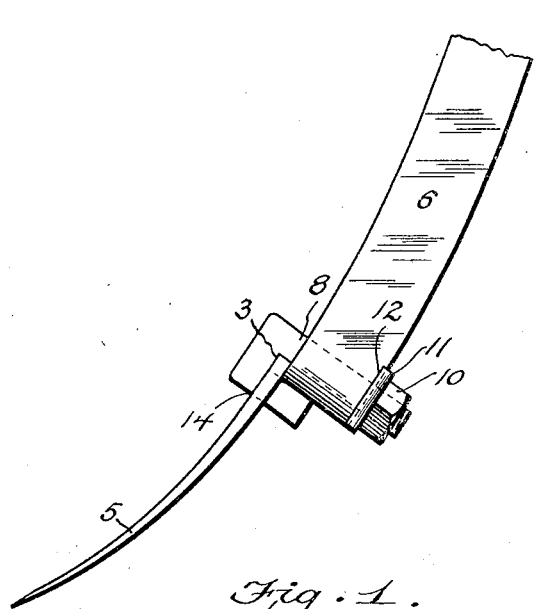
Figure 2:
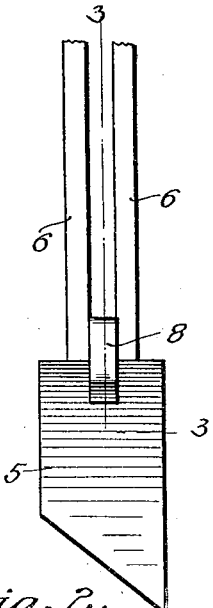
Figure 3:
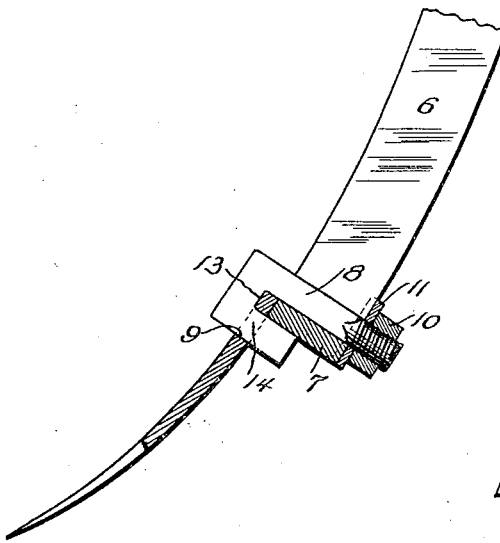
Figure 4:
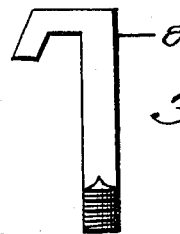

In the accompanying drawings, Figure 1 is a side elevation, and Fig. 2 a front elevation of the invention; Fig. 3, a vertical section on the line 3 3 of Fig. 2. Fig. 4 is an elevation of a modified form of bolt.

Referring specifically to the drawings, 5 denotes the shovel. The standard comprises two spaced flat bars 6, which are joined at their lower ends, as at 7. The clamp for fastening the shovel to the standard comprises a bolt 8, which extends between the bars 6 at their lower ends and is formed at one end with a hook extending through a hole 9 in the shovel. The opposite end of the bolt is threaded to receive a nut 10. Under the nut is a washer-plate 11, which extends across the bars 6. The ends of the plate are turned inwardly, as at 12, to overlap the bars and prevent lateral displacement. The bolt is preferably made square and fits snugly between the bars 6, so that it cannot turn.

The hooked end of the bolt extends over the top edge of the shovel and along the front thereof for a short distance, as at 13, and then extends, as at 14, through the hole 9 in the shovel. The back of the shovel bears on the standard and will be securely clamped thereto when the nut 10 is tightened. The part 14 and the hole 9 are made angular, so that the shovel is prevented from turning on the part 14.

Having thus described my invention, what is claimed as new, and desired to be secured by Letters Patent, is—

The combination with a plow-standard comprising spaced bars connected at their lower ends, and a shovel having a squared hole therein, of a squared bolt extending between the bars, and having a hooked end extending through the hole in the shovel and behind the rear surface thereof, in contact with the said connection between the lower ends of the bars, to sustain the upward thrust on the plow.

In testimony whereof I have signed my name to this specification in the presence of two subscribing witnesses.

JOHN JOSEPH McMANMON

Witnesses:
E. J. PARNELI,
F. S. DEAN.